Patented Mar. 24, 1925.

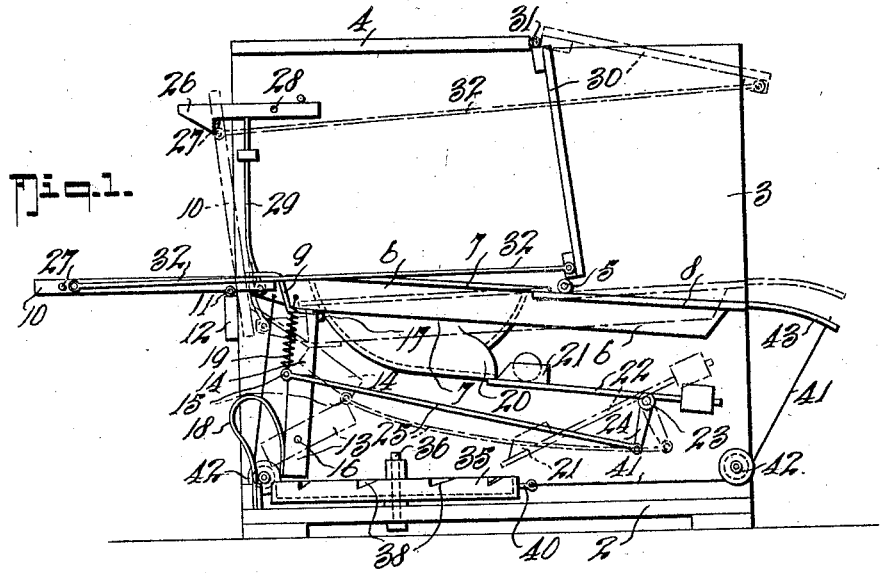

1,531,012

UNITED STATES PATENT OFFICE.

JOHN W. LANGLEY, OF NICOLA VALLEY, BRITISH COLUMBIA, CANADA.

TRAP NEST.

Application filed March 14, 1924. Serial No. 699,308.

*To all whom it may concern:*

Be it known that I, JOHN W. LANGLEY, citizen of the Dominion of Canada, residing at Canford, Nicola Valley, in the Province of British Columbia, Canada, have invented certain new and useful Improvements in Trap Nests, of which the following is a specification.

This invention relates to a trap nest for domestic fowl, and is designed to admit the bird through one opening and allow it to pass out through another opening after laying, the entrance door being closed when the exit door is opened, and vice versa, so that the laying birds can be separated from those not laying as the release of the exit door is effected, not merely by the bird's presence on the nest, but by deposit of an egg.

A further provision is made for withdrawal of the eggs as laid to prevent them injuring one another during delivery.

The means by which these several objects are attained is fully set forth in the following specification, reference being made to the drawings by which it is accompanied, in which:

Fig. 1 is a sectional elevation of the nest, the near side being removed.

Fig. 2 is a plan of the nest box below the nest frame and treadle, showing the provision for delivery of the egg from the nest.

Fig. 3 is an end elevation of the same in the direction of the arrow 3 in Fig. 2.

In these drawings 2 represents the bottom, 3 the sides and 4 the top of the boxlike frame within which the nest is supported. Pivotally mounted on a rod 5 between the sides 3 of this box frame is a nest frame 6 carrying toward the front end a nest 7 and on the opposite side of the pivot an exit treadle 8.

Flexibly connected by straps 9 to the front end of the nest frame 6 is the entrance door 10 which, adjacent its connection to the nest frame, is pivoted on a rod 11 to a cross rail 12 between the sides 3 of the box frame, to assume a normally horizontal open position, as shown by the full lines in Fig. 1, or an upright closed position, as by the dot and dash lines in the same figure.

On the other side of the nest 7 an exit door 30 is suspended at 31 from the top 4 of the box frame, and is connected by a rod 32 to the entrance door 10. With this connection, as these doors open in opposite directions, the exit door 30 opens, while the entrance door 10 closes, and vice versa.

Movement from the open to the closed position of the door 10 is effected by depression of the end of the nest frame 6, which is connected to it, as by the weight of a hen in the nest 7, but as it is not desired to effect the closing of the entrance door and the opening of the exit door unless the hen which occupies the nest first deposits an egg, the front end of the nest frame 6 which is connected to this entrance door 10, is supported in its normal position against such depression by a toggle support 13, 14, the members of which are hinged together at 15 with the lower end of 13 pivoted at 16 to one of the sides 3 of the box frame, and the upper end of 14 hinged at 17 to the front end of the nest frame 6. The toggle is normally retained in its upright position by springs 18 and 19.

This toggle strut is connected adjacent its articulation 15 by a wire 25 to a short lever 24 downwardly projecting from a rocking shaft 23 mounted in the sides 3, on which shaft is secured an arm 22 having an egg receiving receptacle 21 which, by a counterweight on the arm 22, is normally supported adjacent the end of a chute 20 from the nest 7.

Thus, when the hen has laid an egg that egg rolls from the nest 7 through the chute 20 and into the receptacle 21 of the rocking shaft arm, and its weight at the longer end of the arm 22 overcomes the counterweight of that arm and rocks the shaft to draw back the short arm 24 to break the toggle 13, 14, as shown by the dot and dash lines in Fig. 1, thereby depriving the front end of the nest frame 6 of its support. The weight of the hen on the nest then depresses that end of the nest frame and tilts the door 10 to its closed position, as shown by dot and dash lines in Fig. 1. In this closed position it is retained by a latch 26 pivoted at 28 to one of the sides 3 and adapted to engage a pin 27 projecting from the adjacent side of the door 10.

As this door 10 closes, the exit door 30 opens and the hen having performed its duty is free to leave the nest box.

As soon as the weight of the outgoing hen passes the pivot 5 of the nest frame, its weight on the treadle 8 depresses that end of the nest frame to its normal position, the upward movement of the front end lifting the latch 26 to release the entrance door 10 by means of a rod 29 connected to the front end of the frame 6 and directed upward to engage the latch and permit it to fall to the normal open position, in which movement the exit door 30 falls shut.

In order that the eggs as delivered from the nest may not encounter one another with the risk of injury, a circular egg magazine 35 is mounted beneath the nest to turn on a central pin 36. This magazine is divided by partitions 37 into a series of separate compartments, each adapted to receive an egg and its edge rim is notched as at 38 that it may be moved through an angular distance corresponding to the space between the partitions 37 by the oscillating movement of the nest frame 6 on its pivot. A wire rod 40 is slidably mounted adjacent the rim of 35, which rod has a projection 39 adapted, when moved endwise, to successively engage the notches 38 of the magazine and rotate it through the space of one compartment, when moved endwise in one direction, and to lift over the incline of the notches during its return movement. The ends of the rod 40 are connected by a flexible line 41 to the opposite ends of the nest frame 6, so that the rod moves back and forth as that frame oscillates on its pivot 5. Connection to the treadle end of the frame 6 is made to a resilient tongue 43 to equalize the distances from the pivot 5 and to maintain a tension on the line 41.

To prevent an egg being delivered to the magazine after all the compartments are filled, a stop member 45 projects from the rim of the magazine 35, which projection, after one complete revolution of the magazine, engages a stop pin 46 upwardly projecting from the bottom 2 of the box frame and prevents rotation further. When the magazine 35 cannot be pulled round, the treadle 8 cannot be depressed and consequently the latch 26 cannot be released by the rod 29 and the entrance door 10 remains closed.

In use, the nest box is normally in the position shown by the full lines in Fig. 1, with the entrance door open and the exit door closed, being maintained in that position by the toggle support 13, 14, under the front end of the nest frame 6 pivoted at 5.

The entrance of the hen to the nest does not effect any change except that the presence of her weight on the nest is ready to effect the required movement. When the egg is laid it rolls out through the chute 20, on the end of the rocking arm 22, which is counterweighted to maintain its position opposite the outer end of the chute. The weight of this egg overbalances the counterweight and rocks the shaft 23, which movement breaks the toggle support 13, 14, as indicated by the dot and dash lines, and allows the front end of the nest frame 6, under the weight of the hen, to fall, in which movement it closes and automatically latches the door 10 and simultaneously opens the exit door 30.

After the arm 22 has delivered the egg into one of the compartments of the magazine 35, the rocking movement of the nest frame 6 rotates the magazine by means of the line 41 and rod 40 through the required distance to bring another space opposite the rocking lever 22 and restores the support 13, 14 to its upright position.

Having now particularly described my invention, I hereby declare that what I claim as new and desire to be protected in by Letters Patent, is:

1. A trap nest, comprising in combination an open ended boxlike frame, the ends of which are closable by doors, a nest supported on a frame between the two doors, means for delivering an egg from the nest into a separate compartment of an egg container, means operative by the presence of a hen on the nest and by the delivery of an egg therefrom for closing the entrance door and opening the exit door, means operative by departure of a hen from the nest for opening the entrance door and closing the exit door and for moving the egg holding receptacle to bring another compartment opposite the egg delivery from the nest.

2. A trap nest, comprising the combination with an open ended boxlike frame having an entrance door hinged at one end and an exit door at the other, means for connecting these doors to move together so that while one is opened the other is closed, a nest frame pivotally mounted intermediate its ends in the space between the two doors, means for connecting the front end of said frame to the entrance door to close it when that end of the nest frame is depressed, as by a hen on the nest, means for supporting the front end of the nest frame against such depression, means for delivering from the nest an egg laid in it, means operative by delivery of the egg from the nest for withdrawing the front end support of the nest frame whereby that end is depressed and closes the entrance door, and means operative by the weight of the bird as it leaves the nest for opening the entrance door and closing that of the exit.

3. A trap nest, comprising in combination, an open ended boxlike frame having an entrance door and an exit door so connected together so that when one is opened the other is closed, a nest frame pivotally mounted intermediate its ends between the two doors, said frame having a nest on the end toward the entrance door, and a treadle on the other side of the pivot adjacent the exit door, means for connecting the end of the nest frame to the entrance door that when the frame is depressed with the weight of a hen on the nest the entrance door is closed, releasable means for supporting that end of the frame against depression, a revolvable egg receptacle below the nest, said receptacle divided into a series of compartments, means for delivering an egg from the nest into one of the compartments of the receptacle, means operative by the delivery of an egg from the nest for withdrawing the support and allowing the nest to fall, and means operative by departure of the hen from the nest for restoring the nest frame to its normal position and for moving the egg receptacle to bring another compartment of it opposite the egg delivery means.

4. A trap nest, comprising in combination an open ended boxlike frame having an entrance door and exit door operative together so that when one is opened the other is closed, a nest frame connected to the entrance door so that downward movement of the frame opens that door, means for normally supporting the nest frame with the entrance door open, means operative by the delivery of an egg from the nest for withdrawing the nest frame support, an egg holding receptacle divided into separate compartments into which the egg is delivered from the nest, means operative by departure of the hen from the nest for opening the entrance door and closing the exit door, means operative by movement of the nest frame for bringing a fresh compartment of the egg receptacle into position to receive another egg, and means, when all the compartments of the egg receptacle are filled, for preventing opening of the entrance door.

In testimony whereof I affix my signature.

JOHN W. LANGLEY.